United States Patent
Bippus et al.

[11] Patent Number: 5,641,312
[45] Date of Patent: Jun. 24, 1997

[54] TERMINAL BLOCK AND FUNCTION PLUGS

[75] Inventors: Hans-Dieter Bippus, Hogate; Rafik Munshi, Gorokan; Jeff Glen, Birchgrove, all of Australia

[73] Assignee: Krone Aktiengesellschaft, Berlin-Zehlendorf, Germany

[21] Appl. No.: 311,145

[22] Filed: Sep. 23, 1994

[30] Foreign Application Priority Data

Sep. 24, 1993 [DE] Germany .................. 43 33 263.3

[51] Int. Cl.$^6$ ........................................... H01R 9/24
[52] U.S. Cl. ........................................ 439/709; 439/922
[58] Field of Search ........................... 439/709, 719, 439/511, 507, 510, 395, 404, 922

[56] References Cited

U.S. PATENT DOCUMENTS

| | | | |
|---|---|---|---|
| 3,760,328 | 9/1973 | Georgopulos | 439/922 |
| 4,283,103 | 8/1981 | Forberg et al. | 439/922 |
| 4,822,306 | 4/1989 | Klaiber | 439/922 |
| 4,851,967 | 7/1989 | Gerke et al. | 439/922 |
| 5,071,356 | 12/1991 | Strate et al. | 439/511 |
| 5,224,881 | 7/1993 | Lejuste et al. | 439/922 |

FOREIGN PATENT DOCUMENTS

29 02 536  12/1980  Germany.

*Primary Examiner*—Hien Vu
*Attorney, Agent, or Firm*—McGlew and Tuttle

[57] ABSTRACT

A terminal block with a plastic housing and insulation displacement contact elements provided therein for incoming and outgoing conductors. In order to simplify the termination of the conductors at the insulation displacement contact elements and to permit a protection of the conductors against surge voltages and surge currents, it is provided that the insulation displacement contact elements are disposed separately from each other in the plastic housing, and that each insulation displacement contact element is provided with a center tapping. The spaced center tappings opposedly disposed in the plastic housing can be connected with each other by different function plugs.

19 Claims, 10 Drawing Sheets

TERMINAL BLOCK AND FUNCTION PLUGS

FIELD OF THE INVENTION

The present invention relates to a terminal block comprising a plastic housing and insulation displacement contact elements provided therein for incoming and outgoing conductors. Such terminal blocks are used for connecting conductors for voltages up to 1,000 volts.

BACKGROUND OF THE INVENTION

A terminal block of the type referred to hereinbefore is known in the art from DE-PS 29 02 536. In this terminal block, the conductors are inserted into operating members of an electrically insulating material movably disposed in the plastic housing and are pressed, by a pivoting movement of the operating members, into the insulation displacement contact elements provided with cutting edges. The two insulation displacement contact elements of the terminal block are connectively connected with each other over a metal connection, so that after pressing the conductors into the contact slots of the insulation displacement contact elements, an electrical connection between the two conductors is established. This is accomplished without a stripping of the conductors being necessary, since when establishing the connection, the cutting edges of the insulation displacement contact elements will penetrate the insulations of the conductors, and the electrical connection will be established by squeezing the metal conductor core. It is disadvantageous, in this prior art terminal block, that an additional operating member is required for pressing the conductors into the insulation displacement contact elements. Further, it is disadvantageous that a protection of the conductors connected in the terminal block against voltage surges and a tapping of the voltage conducted over the terminal block are not possible.

SUMMARY AND OBJECTS OF THE INVENTION

It is therefore the object of the invention to improve a terminal block of the type referred to hereinbefore such that the termination of the conductors at the insulation displacement contact elements is simplified, and a protection of the conductors against voltage surges and/or surge currents as well as a tapping of the voltages conducted over the terminal block are possible.

The solution of this object is achieved, according to the invention, in that the insulation displacement contact elements are disposed separately from each other in the plastic housing, and that each insulation displacement contact element is provided with a center tapping, and the spaced center tappings oppositely disposed in the plastic housing can be connected with each other by different function plugs. The terminal block according to the invention has thus two insulation displacement contacts elements insulated from each other in the plastic housing, which can be connected with a conductor in a simple manner by pressing the conductor into the contact slot of the respective insulation displacement contact element. The incoming and outgoing conductors terminated at the insulation displacement contact elements of the terminal block are at first not electrically connected with each other, since each insulation displacement contact element is provided with a center tapping and the center tappings are spaced. The center tappings are connected with each other only by function plugs of various constructions. It is therefore possible to perform a direct connection of the center tappings by a connection plug. For the protection of the incoming and outgoing conductors, however, a fuse magazine may be plugged onto the center tappings, instead of the connection plug, so that the conductors are connected with each other by the fuse magazine and the fuse elements provided therein. Further, the center tappings can be connected with each other by a test plug permitting access to the conductor path for test purposes.

In a particularly preferred manner several pairs of opposed insulation displacement contact elements are disposed adjacent to each other in a plastic housing. The disposal of ten pairs of opposed insulation displacement contact elements in the plastic housing is preferred. In another embodiment according to the invention, the disposal of bridge plugs is possible for the electrical connection of two or several adjacent insulation displacement contact elements, the bridge plugs being inserted into bridge tappings assigned to the insulation displacement contact elements and the respective center tappings. Thereby, the voltage coming in over an incoming conductor at an insulation displacement contact element of a pair can be transferred to several opposed and adjacent insulation displacement contact elements and the outgoing conductors connected thereat.

The terminal block according to the invention is particularly suitable for the connection of copper conductors (even stranded conductors) having conductor cross-sections between approximately 0.5 mm and 1.5 mm, the insulation conditions up to 1,000 volts being met. The terminal block is particularly employed for all electrical switch, protection and control devices, such as programmable controller wirings, air-conditioning systems, motor controllers, signalling devices, industrial processing equipment and the like.

The terminal block includes a one-piece contact, which is simultaneously used, however, in an opposed arrangement as a contact pair, and wherein the terminated conductor can be connected or disconnected by means of a connection plug. Further, the conductors at one side of the terminal block adapted as a block of ten can commonly be electrically connected by means of a bridge plug. Even the integration of fuse modules or test plugs between the contacts is possible. The terminal block is suitable for higher voltages, higher currents and large conductor cross-sections.

In the following, the invention will be described in more detail, with reference to an embodiment of a terminal block for ten pairs of opposed insulation displacement contact elements and to several embodiments of function plugs.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 121 is a view of a connection plug.

DETAILED DESCRIPTION OF THE PREFERRED EMBODIMENTS

Referring to FIGS. 1 to 6, the terminal block 1 is composed of a plastic housing 2 having a lower portion 3 and an upper portion 4 that are provided at their longitudinal side borders with latch lugs 5 and latch grooves 6, resp. These snap into each other for closing the plastic housing 2. On the lower portion 3 there are placed insulation displacement contact elements 7 in an insulated manner. The insulation displacement contact elements 7 project into elevations 8 of the upper portion 4 and are contacted there with incoming and outgoing conductors 9 and 10, resp. The elevations 8 have therebetween clamping slots 11 with clamping webs 12 (see FIG. 7), which clamp the insulation of the conductors 9, 10. In the embodiment, the terminal block 1 comprises ten clamping slots 11 each at both longitudinal sides.

As is shown in FIGS. 14 to 17, each insulation displacement contact element 7 is provided with a contact slot 13, which in turn comprises a V-shaped introduction opening 14 and is transformed at the bottom or base end into an enlarged opening 15 serving for effecting a certain spring movability of the lateral Insulation Displacement contact (IDC) legs 16 which are formed of a metal, elastic blade-spring material, in particular a copper alloy. The bottom end and the IDC legs 16 forming an insulation displacement portion. Each insulation displacement contact element 7 is provided, over a base web 17, with an assigned center tapping 18, the insulation displacement contact element 7 being disposed at approximately 45° to the base web 17 and the center tapping 18 at approximately 90° to the base web 17 in a U-shaped manner, as is shown in the top view according to FIG. 16. The center tapping 18 is formed of two opposed contact legs 19, which have a profiled shape in the insertion slot 32, as is shown in particular by the development in FIG. 17. The base web 17 comprises below the insulation displacement contact element 7 an L-shaped bridge contact tongue 20 extending in parallel to the base web 17 and at 45° to the insulation displacement contact element 7, the contact tongue forming, together with the lower edge 48 of the base web 17, a bridge tapping 21.

Figure 1:
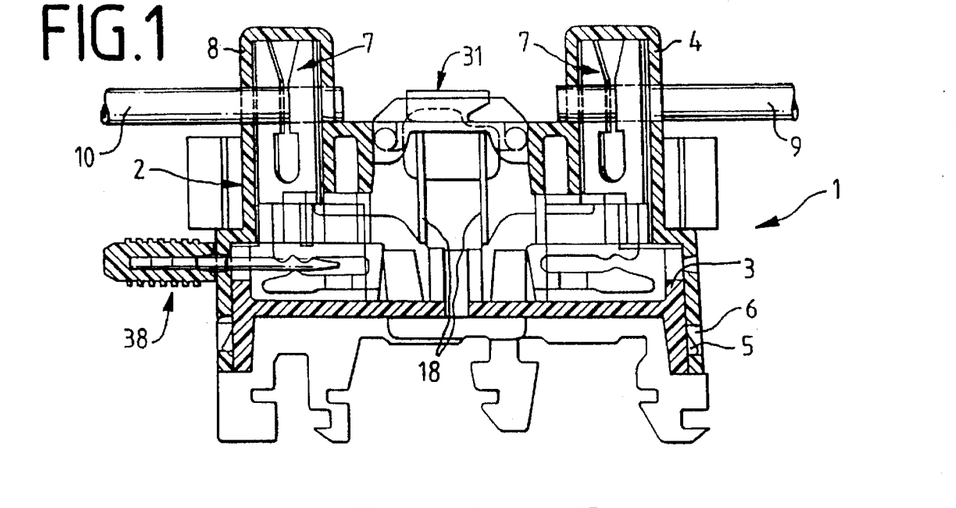
FIG. 1 is a cross-sectioned view of the terminal block.
Figure 2:
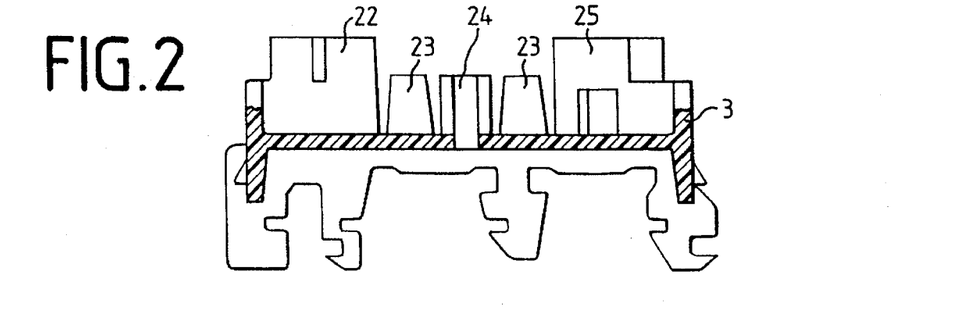
FIG. 2 is a cross-sectioned view of the lower housing portion.
Figure 3:
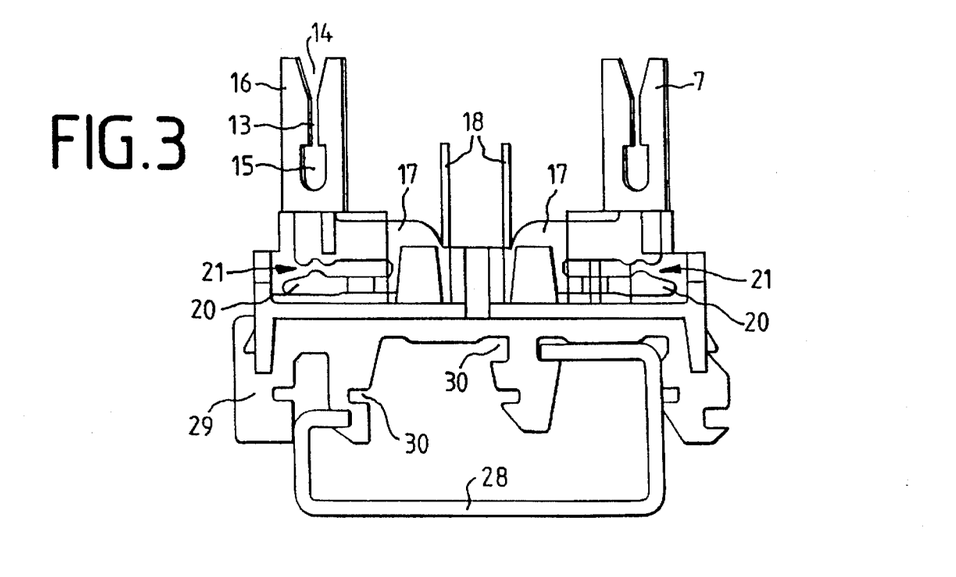
FIG. 3 is a cross-sectioned view according to FIG. 2 with inserted insulation displacement contact elements.
Figure 4:
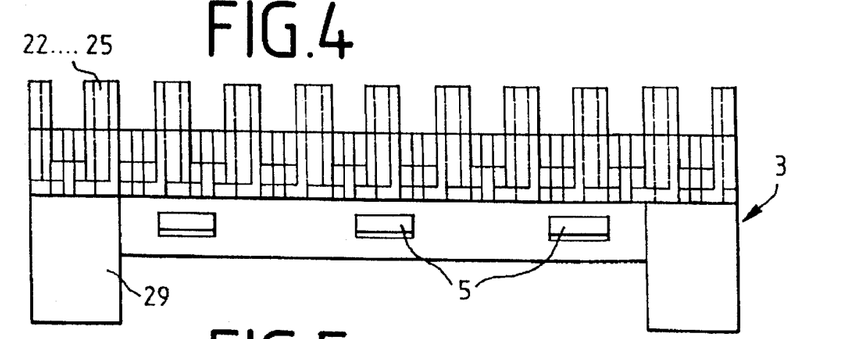
FIG. 4 is a side view of the lower portion.
Figure 5:
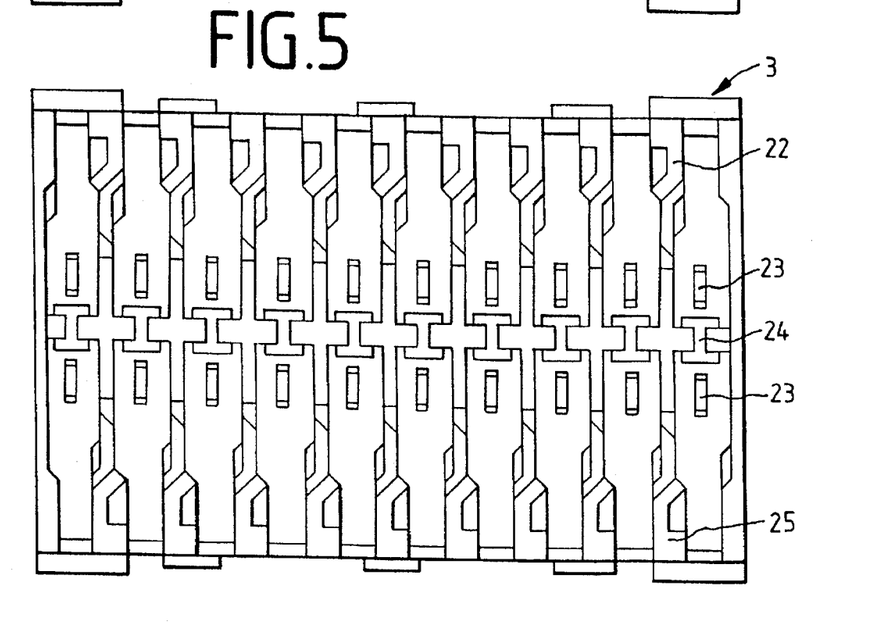
FIG. 5 is a top view of the lower portion.
Figure 6:
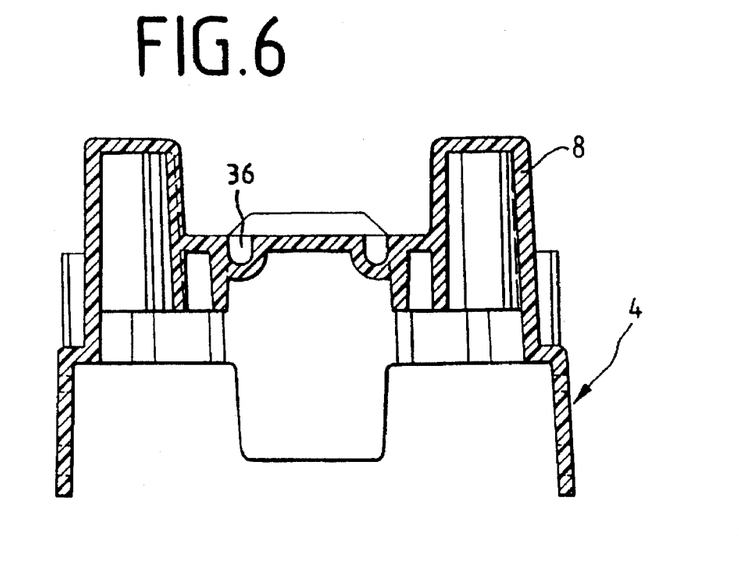
FIG. 6 is a side view of the upper portion.
Figure 7:
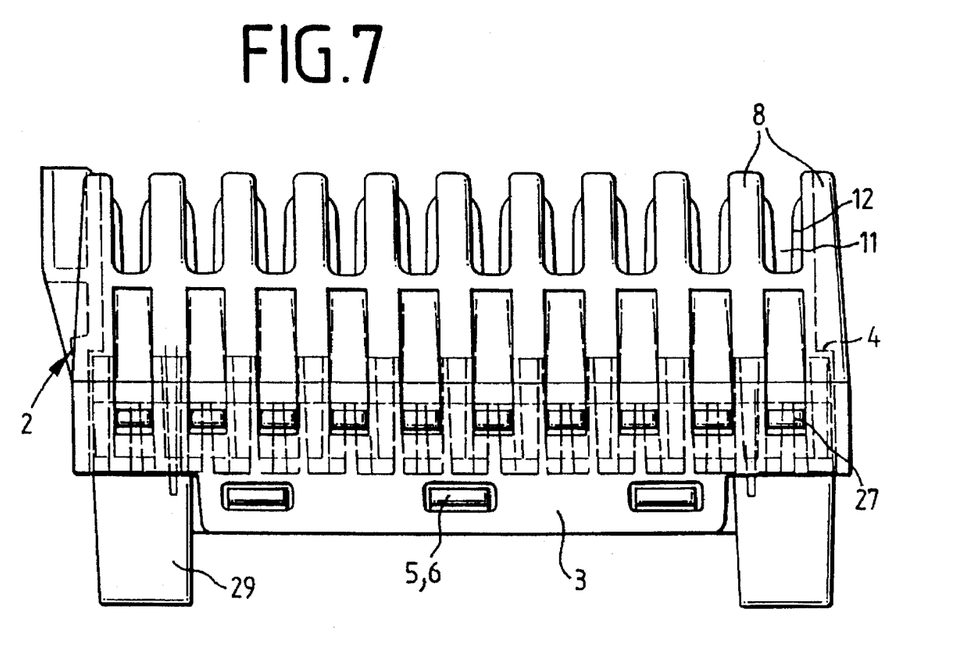
FIG. 7 is a side view of the assembled terminal block.
Figures 8, 10:
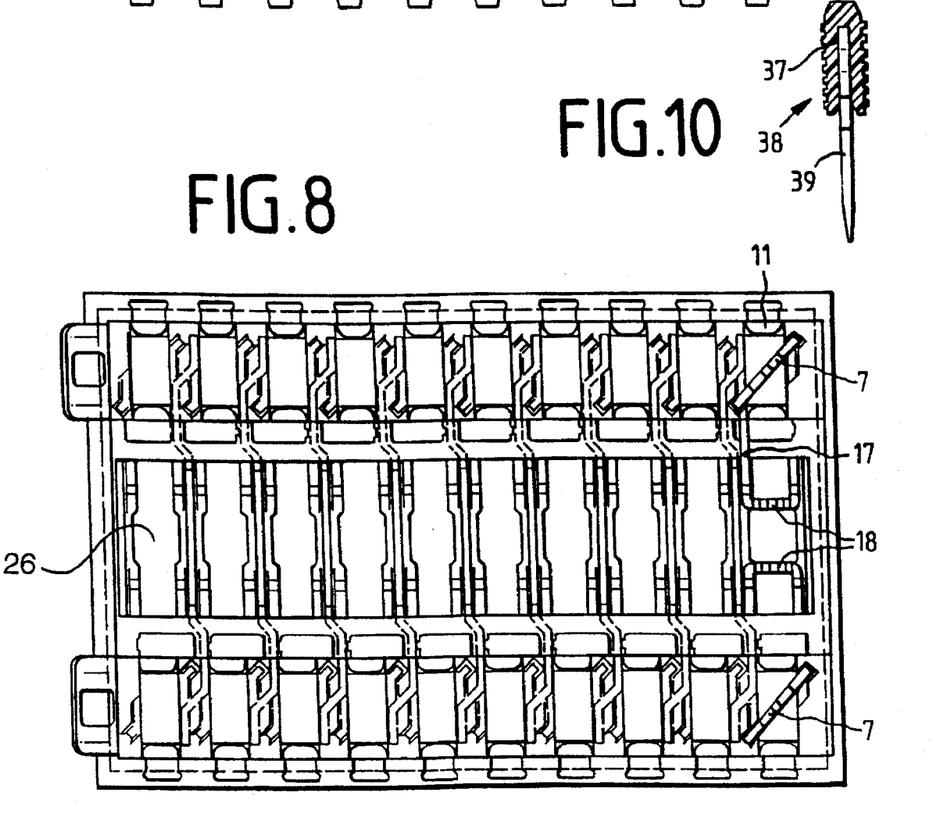
FIG. 8 is a top view of the terminal block.
FIG. 10 is a side view of the bridge.
Figure 16:
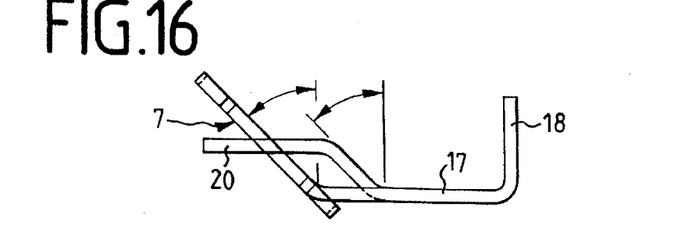
FIG. 16 is a top view of the insulation displacement contact.
Figure 17:
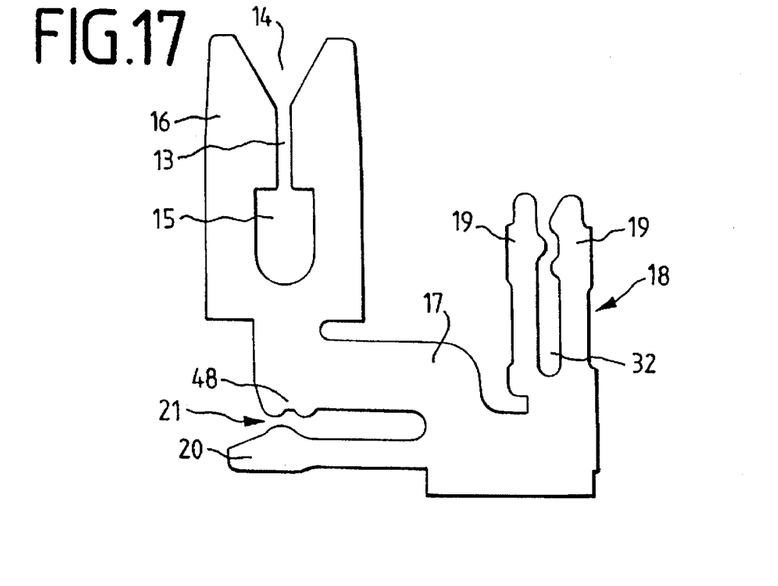
FIG. 17 is a view illustrating the development of the insulation displacement contact.

As is shown in FIG. 3, two insulation displacement contact elements 7 are placed, together with the respectively assigned center tappings 18 and bridge tappings 21, opposedly and insulatedly from each other onto the lower portion 3, for which purpose the latter comprises differently formed elevations 22 to 25, which are individually shown in particular in FIG. 2 and between which the individual insulation displacement contact elements 7 bent-off according to FIG. 16 are disposed, together with their base webs 17, center tappings 18 and contact tongues 20. The upper portion 4 shown in FIG. 6 encloses the individual insulation displacement contact elements 7 as well as the center tappings 18 and bridge tappings 21. The insulation displacement contact elements 7 are accessible through the clamping slots 11. The center tappings 18 are accessible through insertion openings 26 and the bridge tappings 21 are accessible through insertion openings 27 (FIGS. 7, 8).

The terminal block 1 is provided for latching ten incoming conductors 9 and ten outgoing conductors 10 onto DIN rails 28 (FIG. 3). The terminal block 1 has rail elevations 29 with latch slots 30 having various arrangements are formed below the lower portion 3, so to be able to snap the terminal block 1 onto DIN rails 28 of different constructions.

Figure 11:
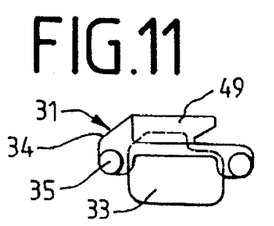
Figure 12:
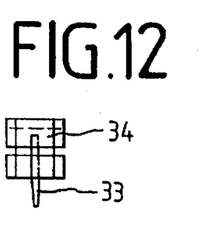
FIG. 12 is a side view of the connection plug.
Figure 13:
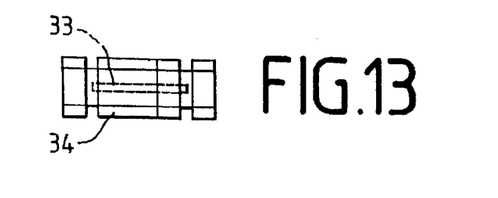
FIG. 13 is a top view of the connection plug.
Figure 14:
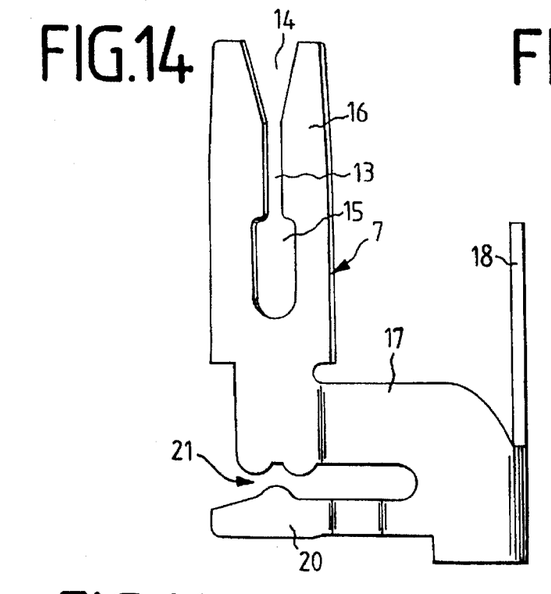
FIG. 14 is a view of the insulation displacement contact.
Figure 15:
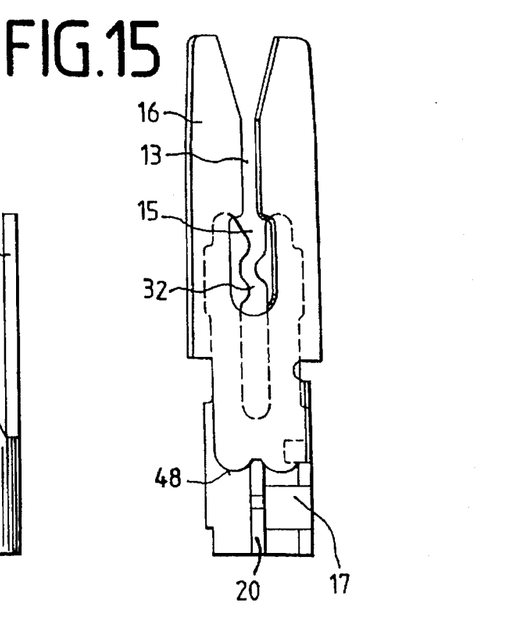
FIG. 15 is a side view of the insulation displacement contact.

The spacely opposed center tappings 18 of each pair of insulation displacement contact elements 7 in the plastic housing 2 can be electrically connected with each other by different function plugs. FIGS. 11 to 13 show a connection plug 31 mounted onto the terminal block 1 according to FIG. 1, the connection plug being formed of a contact tongue 33 to be inserted into the insertion slots 32 of the opposed center tappings 18, and of a plastic body 34 serving as a handle, the plastic body having latch lugs 35 having circular cross-sections at the opposed ends of the contact tongue 33, and being latchable in latch grooves 36 having semi-circular cross-sections and being disposed in the center portion of the plastic body 2. In this way, two opposed insulation displacement contact elements 7 can be electrically connected with each other by means of a connection plug 31. The circular shape of the latch grooves 36 and latch lugs 35 permits the connection plug 31 to be pivotingly arranged in the center portion of the plastic body 2 and to be swingable up by 90° in order to separate the connection between two insulation displacement contact elements 7, whereupon the contact tongue 33 will come out of engagement with the center tappings 18.

Figure 9:
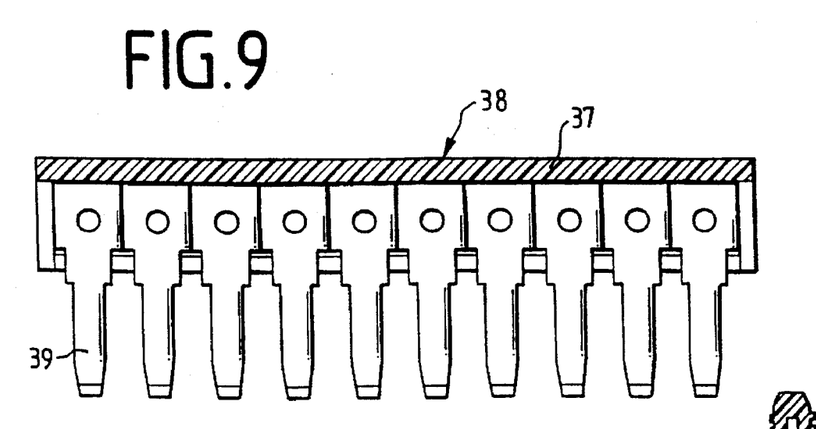
FIG. 9 is a top view of a bridge.
Figure 18:
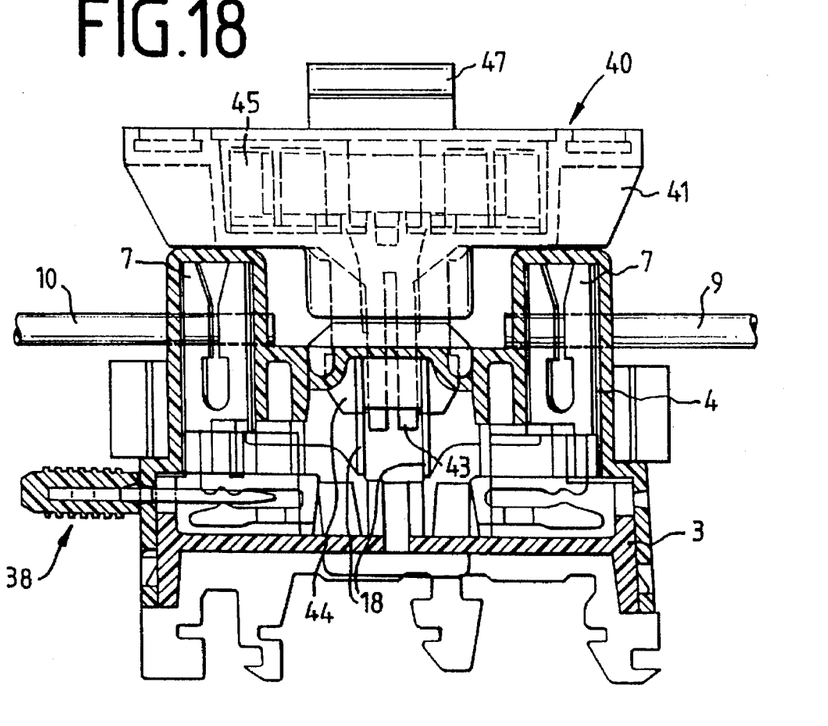
FIG. 18 is a cross sectional view of the terminal block with inserted fuse magazine.
Figure 19:
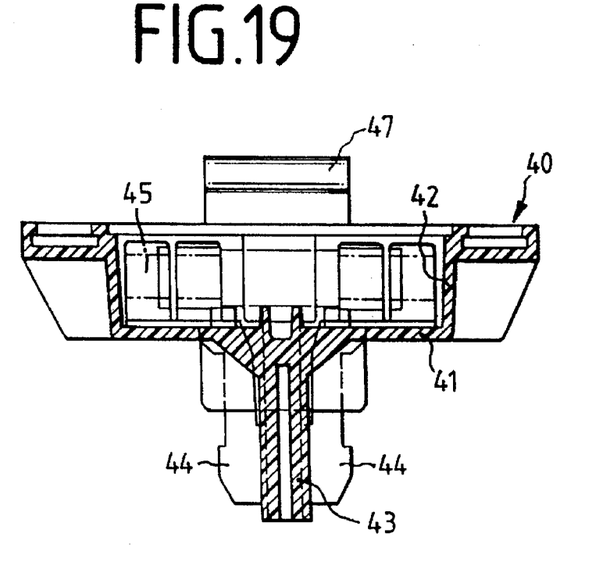
FIG. 19 is a cross sectional view of the view of the fuse magazine.
Figure 20:
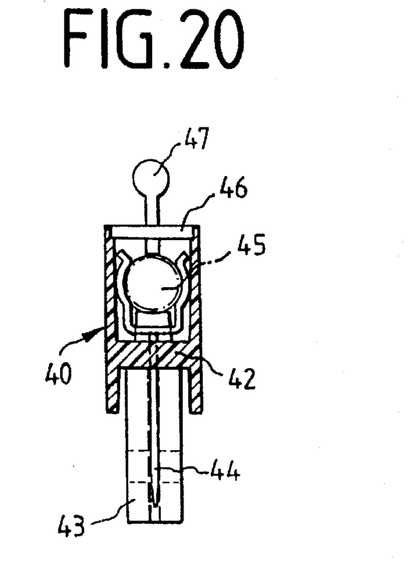
FIG. 20 is a side view of the fuse magazine.

FIG. 9 shows ten bridge plugs 38 disposed in a plastic housing 37, the plug tongues 39 of which can be inserted through the insertion openings 27 (FIG. 7) into the bridge tappings 21 of adjacent insulation displacement contact elements 7 at a longitudinal side of the terminal block 1. The individual bridge plugs 38 are electrically connected with each other in the plastic housing 37. Thus all ten insulation displacement contact elements 7 of a longitudinal side of the terminal block 1 commonly can be electrically connected with each other. A lower number of bridge plugs 38 can also be disposed adjacently in a plastic housing 37, in order to electrically connect with each other just two or more insulation displacement contact elements 7. In this way, an incoming electrical conductor 9 terminated at one longitudinal side of the terminal block 1 can be electrically connected simultaneously with two or more outgoing electrical conductors 10 at the other side of the terminal block 1. The plug tongues 39 penetrate the insertion opening 27 and engage into the bridge tapping 21 (FIGS. 14 to 17), the plug tongue 39 at the lower side being contacted by the contact tongue 20 and at the upper side by the lower side of the base web portion 17 disposed at 45°, as is shown in FIG. 16. FIGS. 18 to 20 show another function plug as a fuse magazine 40. The latter comprises a plastic body 41 extending transversely over the terminal block I and having a reception chamber 42 and a downwardly projecting plug guide portion 43 for metal contact tongues 44 provided at either side thereof, the contact tongues engaging into the insertion slots 32 of two opposed center tappings 18, as is shown in FIG. 18. The two contact tongues 44 project into the reception chamber 42 of the fuse magazine 40 and are in an operational connection with electrical fuses 45 (not shown here), which are disposed in the reception chamber 42. The latter is closed towards the top by a clamping cover 46 with a handle 47. By means of the fuse magazine 40, the center tappings 18 of an opposed pair of insulation displacement contact elements 7 are electrically connected and are protected by means of the fuses 45 against surge voltages and/or surge currents.

Figure 21:
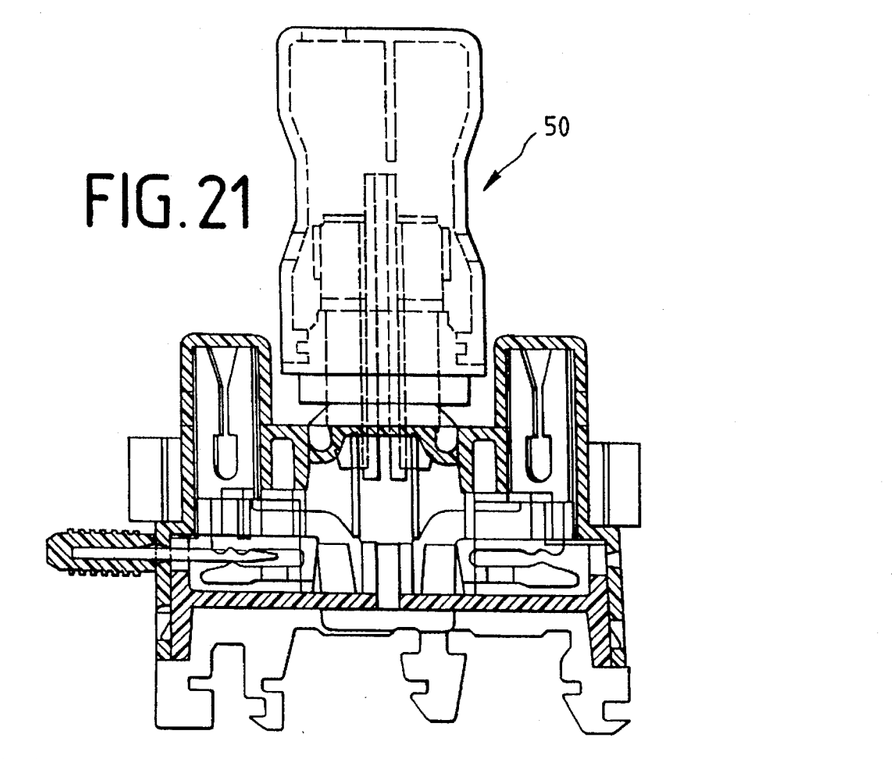
FIG. 21 is a cross sectional view of the terminal block with inserted test plug.
Figure 22:
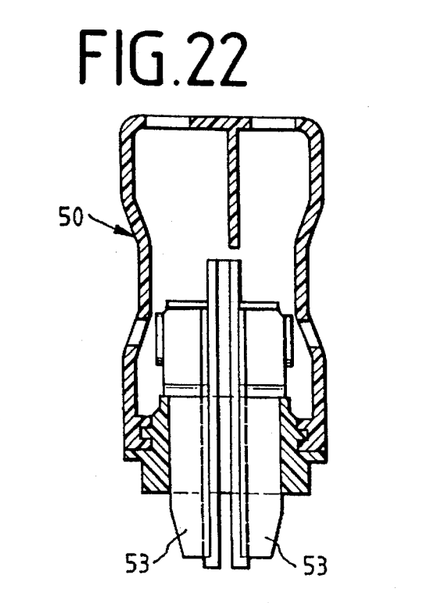
FIG. 22 is a cross sectional view of the test plug.
Figure 23:
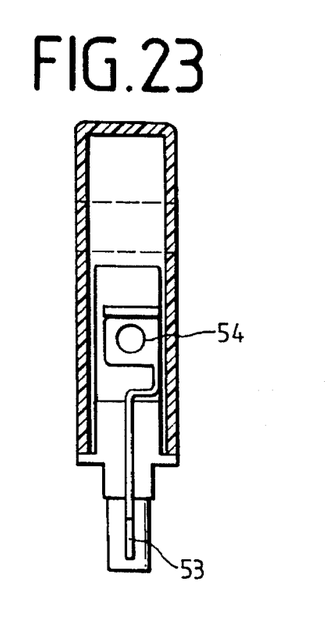
FIG. 23 is a the side sectional view of the test plug.
Figure 24:
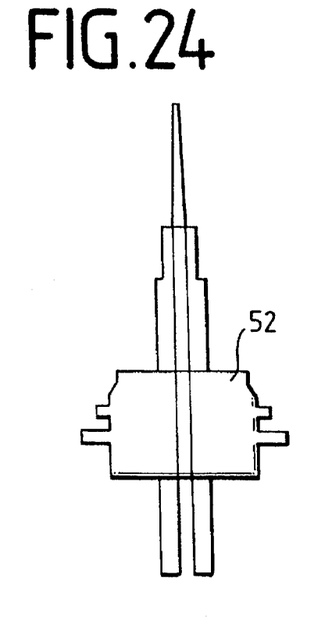
FIG. 24 is a front view of the central portion of the test plug.
Figure 25:
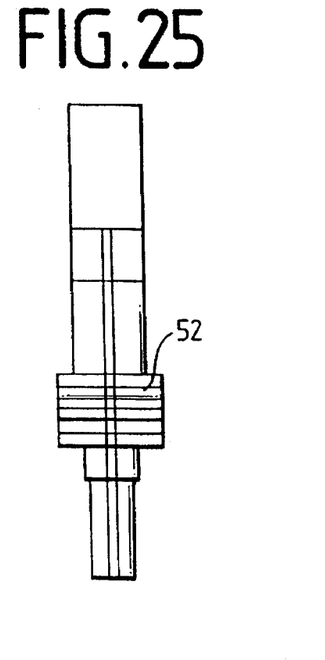
FIG. 25 is a side view of the central portion.
Figure 26:
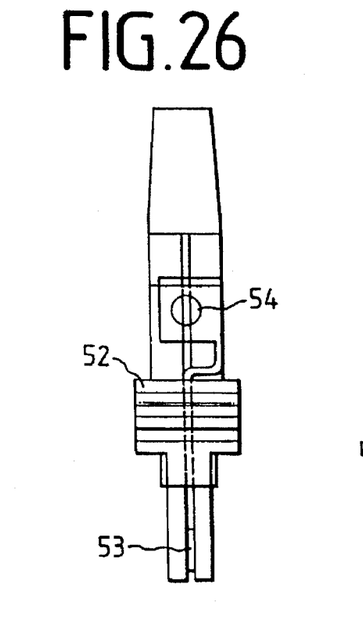
FIG. 26 is a side view of the central portion with inserted contact knives in a side view.
Figure 27:
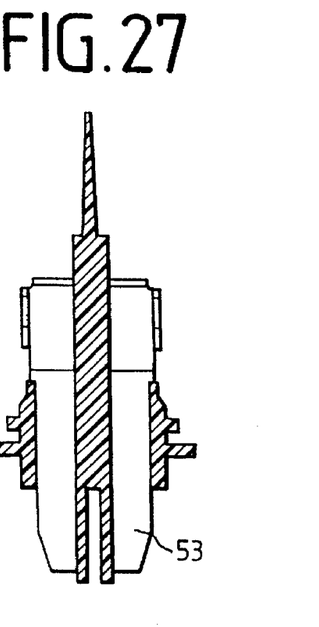
FIG. 27 is a sectional view of the central portion with inserted contact knives.
Figure 28:
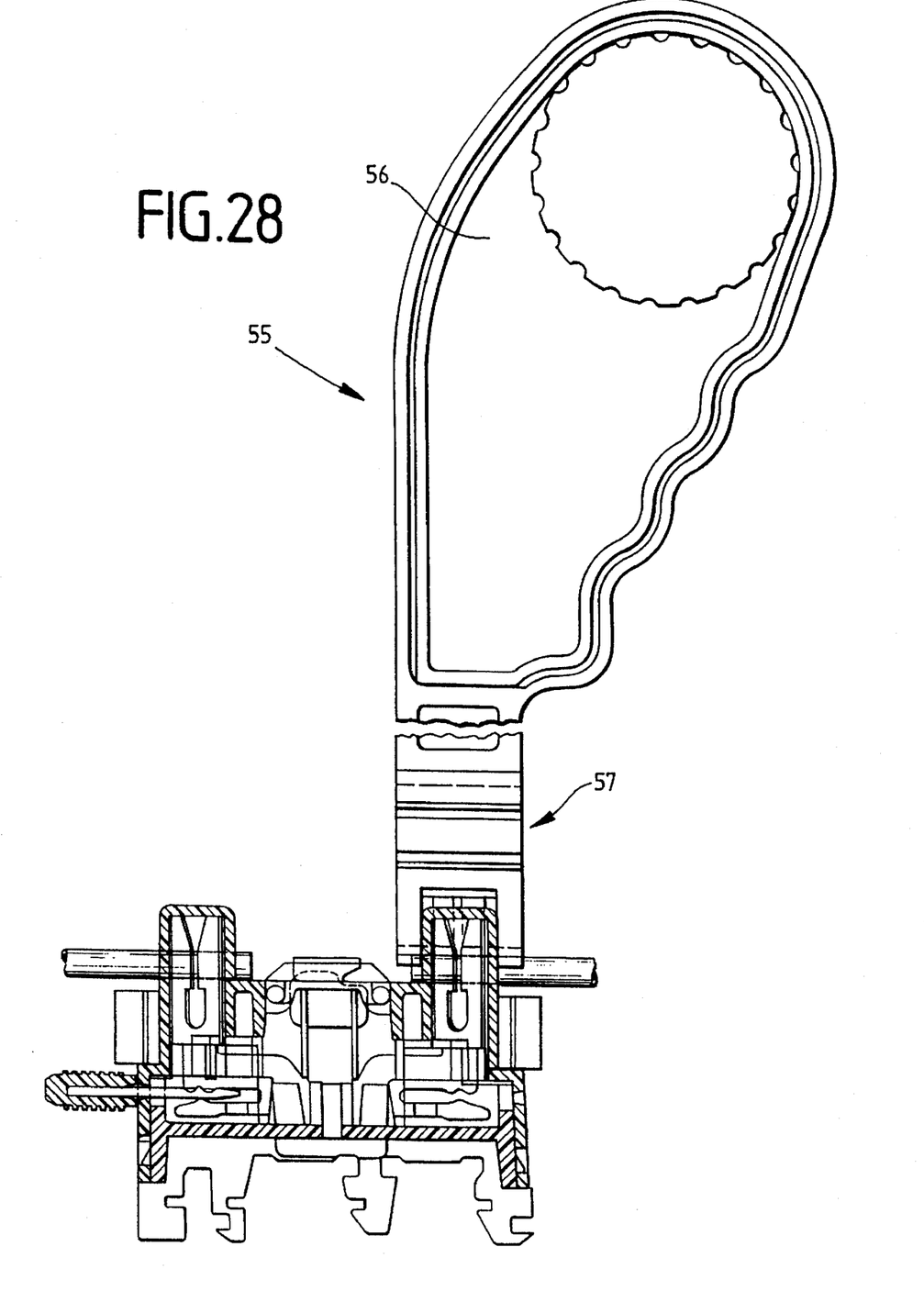
FIG. 28 is a sectional view of the terminal block with a termination tool.
Figure 29:
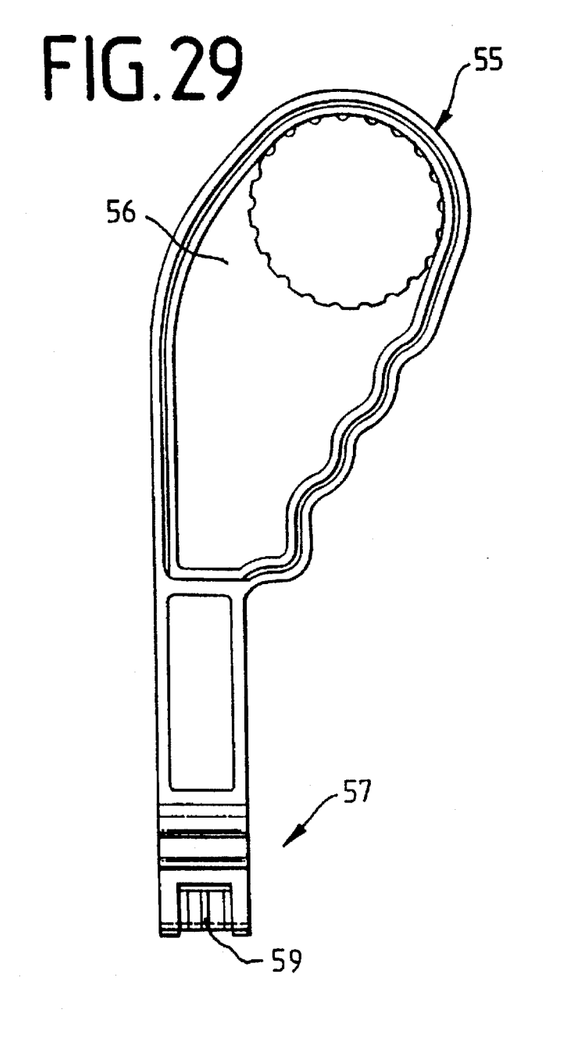
FIG. 29 is a front view of the termination tool.
Figure 30:
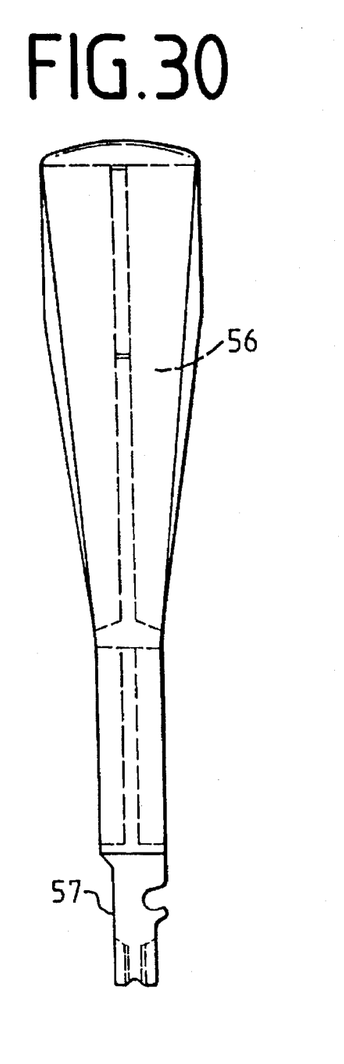
FIG. 30 is a side view of the termination tool.
Figure 31:
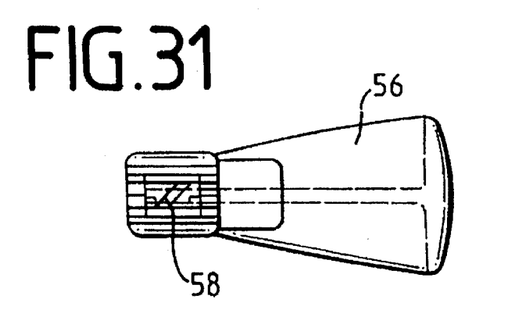
FIG. 31 is a bottom view of the termination tool.

FIGS. 21 to 27 shown another function plug in the form of a test plug 50. The latter consists of a two-piece plastic housing 51 into which is inserted a center piece 52 of plastic separately receiving metal contact tongues 53, at the termination ends 54 of which cables for test purposes can be connected. The contact tongues 53 engage into the insertion slots 32 of the opposed center tappings 18 of two insulation displacement contact elements 7, as is shown in FIG. 21.

Finally, FIGS. 28 to 31 show a termination tool 55 for terminating the incoming and outgoing conductors 9, 10 at the insulation displacement contact elements 7. The termination tool 55 comprises an ergonomically shaped handle 56 with a head 57 comprising, according to the bottom view of FIG. 31, a double-T-shaped tool head 58 with a slot 59 in the center web. By means of the tool head 58, a conductor 9, 10 is pressed into the contact slot 13 of an insulation displacement contact element 7, the insulation displacement contact element 7 engaging into the slot 59, so that the tool head 58 can act on the conductor 9, 10 at both sides of the blade-shaped insulation displacement contact element 7 and press it into the contact slot 13. By means of the sharp-edged knives of the contact legs 16, the insulation of the conductor 9, 10 is cut in, and the conductor core is electrically connected with the insulation displacement contact element 7.

While a specific embodiment of the invention has been shown and described in detail to illustrate the application of the principles of the invention, it will be understood that the invention may be embodied otherwise without departing from such principles.

What is claimed is:

1. A terminal block, comprising:

a plastic housing;

insulation displacement electrical contact elements positioned within said plastic housing for engaging incoming and outgoing conductors, each insulation displacement electrical contact element being disposed separately from other insulation displacement electrical contact elements in said plastic housing, each insulation displacement electrical contact element including a center tapping positioned in a central region of said housing, each center tapping being positioned adjacent to and opposedly disposed from a center tapping of another insulation displacement electrical contact element, at least two pairs of opposed insulation displacement electrical contact elements are disposed in said plastic housing, each of said insulation displacement electrical contact elements including bridge tappings at one side thereof;

function plug means, said function plug means for engaging said center tappings of said opposed insulation displacement electrical contact elements;

and a bridge plug for electrically connecting said insulation displacement electrical contact elements to each other upon inserting said bridge plug into two or more of said bridge tappings.

2. A terminal block according to claim 1, wherein said plastic housing is formed of an upper part and a lower part receiving said insulation displacement electrical contact elements, said upper part and said lower part including latching means for latching said upper part and said lower part together.

3. A terminal block according to claim 2, wherein each insulation displacement electrical contact element includes an insulation displacement portion and a base web connecting a contact portion with said center tapping, said contact portion being disposed at approximately 45° to said base web and said center tapping being disposed at approximately 90° to said base web to define a substantially U-shaped portion, said base web including, below said insulation displacement portion, a contact tongue extending in parallel to said base web and at 45° to said insulation displacement portion, said contact tongue forming, together with a lower edge of said base web, a bridge tapping.

4. A terminal block according to claim 3, wherein said function plug means is provided as a connection plug with a contact tongue to be inserted into the insertion slots of opposed center tappings, said contact tongue being connected to a plastic body serving as handle.

5. A terminal block according to claim 4, wherein said plastic body of said connection plug includes latch lugs at opposed ends of said contact tongue, said latch lugs being latchable in a center portion of said plastic body.

6. A terminal block according to claim 5, wherein said latch lugs have a circular cross-section and said latch grooves have a semi-circular cross-section.

7. A terminal block according to claim 1, further comprising:

rail elevation means extending from said housing and for connecting to DIN rails, said rail elevation means defining a plurality of latch slots for snapping onto a plurality of differently configured DIN rails.

8. A terminal block according to claim 1, wherein:

said center tapping comprises an insertion slot for inserting contact tongues of said function plug means.

9. A terminal block according to claim 8, wherein:

said function plug means is provided as a connection plug with a contact tongue to be inserted into said insertion slots of opposed center tappings, said contact tongue being connected to a plastic body serving as handle.

10. A terminal block according to claim 8, wherein:

said function plug means is formed as a fuse magazine including a plastic body with a reception chamber housing a plurality of fuses and a plug guide portion with two contact tongues engaging into said insertion slots of opposed center tappings.

11. A terminal block according to claim 8, wherein:

said function plug means is formed as a test plug including a plastic housing with two contact tongues forming a center piece, said contact tongues engaging into said insertion slots of opposed center tappings.

12. A terminal block according to claim 1, wherein:

each of said insulation displacement electrical contact elements includes a pair of IDC legs, a base end connecting said IDC legs and a base web extending from said base end;

a bridge contact tongue extends from said base web, said bridge contact tongue and said base end of said insulation displacement electrical contact element define a bridge tapping.

13. A terminal block according to claim 12, wherein:

said bridge contact tongue is positioned substantially in parallel with said base web and substantially 45 degrees to said base end.

14. A terminal block according to claim 1, wherein:

said center tapping is formed of two flat contact legs and define an insertion slot between them, said contact legs being aligned in parallel to each other.

15. A terminal block according to claim 14, wherein:

said insulation displacement electrical contact elements are aligned in two parallel rows, said two rows and said flat contact legs being substantially parallel.

16. A terminal block, comprising:

a plastic housing;

insulation displacement electrical contact elements positioned within said plastic housing for engaging incoming and outgoing conductors, each insulation displacement electrical contact element being disposed separately from other insulation displacement electrical contact elements in said plastic housing, each insulation displacement electrical contact element including a center tapping positioned in a central region of said housing, each center tapping being positioned adjacent to and opposedly disposed from a center tapping of another insulation displacement electrical contact element, each of said insulation displacement electrical contact elements including an insulation displacement portion and a base web connecting a contact portion with said center tapping, said contact portion being disposed at approximately 45 to said base web and said center tapping being disposed at approximately 90 to said base web to define a substantially U-shaped portion, said base web including, below said insulation displacement portion, a contact tongue extending in parallel to said base web and at 45 to said insulation displacement portion, said contact tongue forming, together with a lower edge of said base web, a bridge tapping;

and function plug means, said function plug means for engaging said center tappings of opposed insulation displacement electrical contact elements.

17. A terminal block according to claim 16, wherein said center tapping comprises an insertion slot for inserting contact tongues of said function plug means.

18. A terminal block according to claim 17, wherein said function plug means is formed as a fuse magazine including a plastic body with a reception chamber housing a plurality of fuses and a plug guide portion with two contact tongues engaging into said insertion slots of opposed center tappings.

19. A terminal block according to claim 17, wherein said function plug means is formed as a test plug including a plastic housing with two contact tongues forming a center piece, said contact tongues engaging into said insertion slots of opposed center tappings.

* * * * *